United States Patent
Itoh et al.

(10) Patent No.: US 6,507,197 B1
(45) Date of Patent: Jan. 14, 2003

(54) ELECTROSTATIC FORCE DETECTOR WITH CANTILEVER FOR AN ELECTROSTATIC FORCE MICROSCOPE

(75) Inventors: Akiyoshi Itoh, Chiba (JP); Katsuji Nakagawa, Tokyo (JP); Manabu Tani, Chiba (JP); Toshio Uehara, Chiba (JP); Bruce T. Williams, Lockport, NY (US)

(73) Assignee: Trek, Inc., Medina, NY (US)

( * ) Notice: Subject to any disclaimer, the term of this patent is extended or adjusted under 35 U.S.C. 154(b) by 0 days.

(21) Appl. No.: 09/183,082

(22) Filed: Oct. 30, 1998

Related U.S. Application Data (60) Provisional application No. 60/063,936, filed on Oct. 31, 1997.

(51) Int. Cl.[7] ............................................. G01N 27/60
(52) U.S. Cl. ............................................... 324/456
(58) Field of Search ........................ 324/72, 305, 456, 324/458, 762; 250/234, 306, 307; 73/105

(56) References Cited

U.S. PATENT DOCUMENTS

| | | | | |
|---|---|---|---|---|
| 5,065,103 A | * | 11/1991 | Slinkman et al. | 324/458 |
| 5,334,931 A | * | 8/1994 | Clarke et al. | 324/757 |
| 5,357,105 A | * | 10/1994 | Harp et al. | 250/234 |
| 5,578,745 A | * | 11/1996 | Bayer et al. | 73/1 J |
| 5,969,345 A | * | 10/1999 | Williams et al. | 250/234 |
| 6,002,131 A | * | 12/1999 | Manalis et al. | 250/306 |
| 6,172,506 B1 | * | 1/2001 | Adderton et al. | 324/458 |

* cited by examiner

Primary Examiner—N. Le
Assistant Examiner—Etienne P LeRoux
(74) Attorney, Agent, or Firm—Hodgson Russ LLP (57) ABSTRACT

An electrostatic force microscope wherein electrostatic force applied to the detector is determined through obtaining the field distribution on several different shaped detectors with the calculation of the voltage distribution near the detector with the Finite Element Method to direct the measurement of the absolute charge amount on surface under test so that one can define the differences between the analysis and the results from the parallel plate model. Of interest is how large the error in the charge detection occurs in conjunction with thickness change of dielectric materials to be tested. There is provided a detector with cantilever which has proper shape for the spatial resolution of 10μ made out of nickel foil for an electrostatic force microscope and the electrostatic force which appeared on it has been calculated.

10 Claims, 8 Drawing Sheets

|  | LENGTH | WIDTH | THICKNESS | SPRING CONSTANT[N/m] |
|---|---|---|---|---|
| AFM(ORYMPUS) | 100[μm] | 20[μm] | 0.8[μm] | $3.7 \times 10^{-2}$ |
| CANTILEVER | 1[mm] | 0.3[mm] | 5.0[μm] | $39 \times 10^{-2}$ |

FIG. 12B

ELECTROSTATIC FORCE DETECTOR WITH CANTILEVER FOR AN ELECTROSTATIC FORCE MICROSCOPE

CROSS REFERENCE TO A RELATED APPLICATION

Applicants claim priority on Provisional Patent Application No. 60/063,936 filed Oct. 31, 1997 and entitled "Electrostatic Force Detector With Cantilever For An Electrostatic Force Microscope" which is incorporated herein by reference.

BACKGROUND OF THE INVENTION

Hard copies with higher spatial resolution and better quality full color pictures are always expected in electrophotography technology. The photoreceptor is a key device to acquire the high quality hard copies. While on the one hand it is required to make a precise measurement of charge distribution on a photoreceptor drum, on the other hand the spatial resolution of currently available apparatus is fairly low. Charge distribution measurement with a very high spatial resolution is required both in electrophotography and in semiconductor research. It would be desirable to conduct a study to realize a measurement system which enables the charge distribution measurement to have a spatial resolution less than 10 $\mu$m in diameter with utilizing the electrostatic force. Laser printers may already have the spatial resolution of 600 dpi or higher, which indicates that each pixel has approximately 21 $\mu$m in diameter. Studies have been made relating to the scanning electrostatic force microscope, however, the theoretical aspects of those studies were only extended to the analysis of a parallel plate model and no further discussion was made relating how the detector needle would affect the charge distribution measurement.

Thus, heretofore one was not able to know how precise in spatial resolution the measurement could be accomplished, how large the charge amount detection had been influenced by the shape of detector and how large the change in film thickness as well as dielectric constant of sample under test would affect the measurement.

SUMMARY OF INVENTION

In accordance with the present invention, the electrostatic force to be applied to the detector is determined through obtaining the field distribution on several different shaped detectors with the calculation of the voltage distribution near the detector with the Finite Element Method to direct the measurement of the absolute charge amount on surface under test so that one can define the differences between the analysis and the results from the parallel plate model. Of interest is how large the error in the charge detection occurs in conjunction with thickness change of dielectric materials to be tested. There is provided a detector with cantilever which has a proper shape for the spatial resolution of 10$\mu$ made out of nickel foil for an electrostatic force microscope (EFM) and the electrostatic force which appeared on it has been calculated.

DETAILED DESCRIPTION OF THE ILLUSTRATED EMBODIMENT

Figure 1:
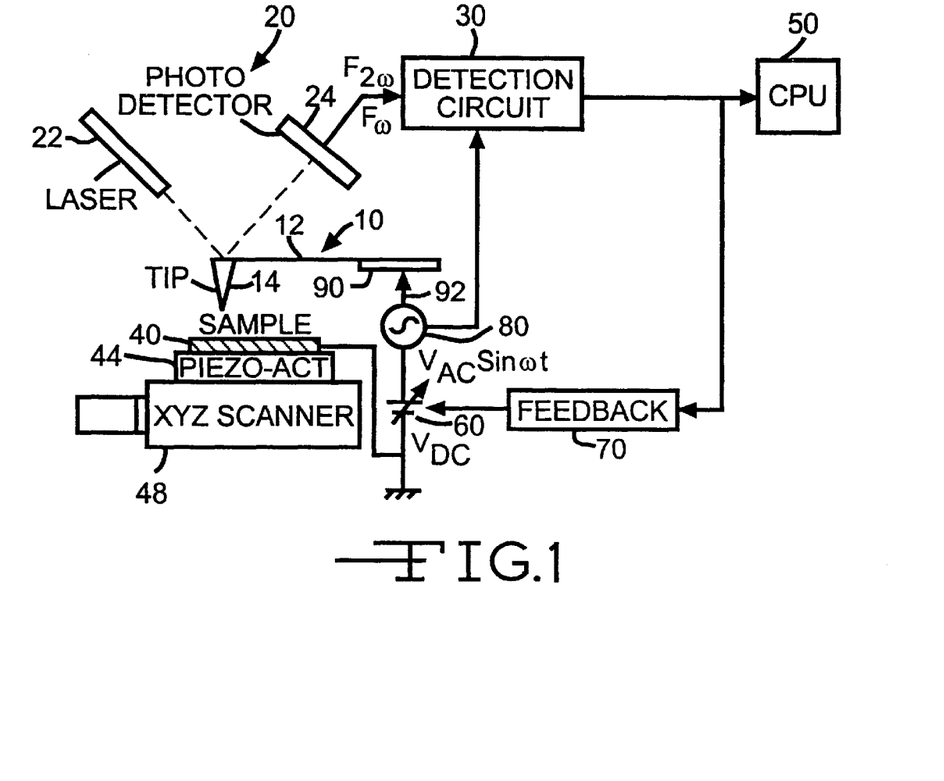
FIG. 1 is a schematic diagram of an electrostatic force microscope according to the present invention.

A representative configuration of the electrostatic microscope according to the present invention is shown is FIG. 1. The system consists of a fine detector with cantilever generally designated 10 and comprising an arm 12 and a needle or tip 14, an optical system 20 comprising laser 22 and photodetector 24, a detection circuit 30, a sample 40 under test operatively associated with an actuator 44 such as a piezoelectric driver which, in turn, is operatively associated with a scanner 48 for the actuator 44, a processor 50 connected to the output of detection circuit 30, a controllable source 60 of direct voltage, a feedback circuit 70 having an input connected to the output of detection circuit 30 and an output connected in controlling relation to d.c. source 60, and an a.c. source 80. The sample 40 under test is connected between d.c. source 60 and an electrical ground or reference. The combination of d.c. source 60 and a.c. source 80 is connected to detector arm 12 and to detection circuit 30.

Figure 2:
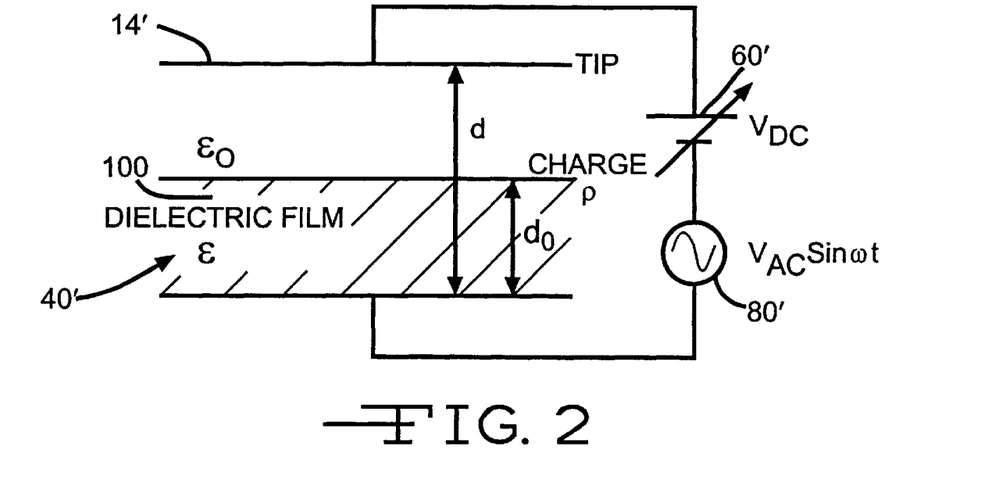
FIG. 2 is a diagrammatic view of a parallel plane model.

Electrostatic force is induced at the tip 14 of the detector due to a charge on the surface 40 under test. The electrostatic force gives a bend to the cantilever of which one of the two ends is fixed to the solid body of transducer 90. The bending amount is transduced as electrical signal with the optical-lever method. An external bias voltage which consists of DC and AC is applied via conductor 92 to the detector to distinguish the polarity of the charge. The bias voltage $V_t$ is given by equation (1) below. Then, the detector receives the vibration force which contains the frequency components of $\omega$ and $2\times\omega$. If the relation between the tip of the detector and the metal substrate is considered as a parallel plane model as shown in FIG. 2, the following equations (2) and (3) give the information of $\omega$ and $2\times\omega$ components from the electrostatic force which appears on the probe tip.

$$V_t = V_{AC} \sin \omega t + V_{DC} \tag{1}$$

$$V_t = V_{AC} \sin \omega t + V_{DC} \tag{1}$$

$$F_\omega = \frac{V_{DC} - \rho d_0/\varepsilon}{[d - (1-\varepsilon_0/\varepsilon)d_0]^2} \varepsilon_0 S V_{AC} \sin \omega t \tag{2}$$

$$F_{2\omega} = \frac{1}{4[d - (1-\varepsilon_0/\varepsilon)d_0]^2} \varepsilon_0 S V_{AC}^2 \cos 2\omega t \tag{3}$$

In the foregoing equations, $V_t$ is the external bias voltage, $\rho$ is the density of the charge distribution, $\in$ is the dielectric constant of the sample under test, $d_o$ is the distance between the detector tip and the surface under test, d is the distance between the detector tip and the metal substrate and S is the area of the plate respectively. If ∈ and $d_o$ were known, one could obtain ρ by detecting $F_\omega$ (ω component of electrostatic force), or by measuring $V_{DC}$, which is given to the detector as a feedback to let $F_\omega$ become zero. If $d_o$ is zero, it means that the surface under test is a solid metal. $F_{2\omega}$ gives the information of roughness on the surface under test with controlling d to make $F_{2\omega}$ constant. Since one has to measure the charge distribution on the dielectric film 100, the condition of $d_o=0$ is not realistic, therefore one has to measure $F_{2\omega}$ directly.

To obtain the electrostatic force which is induced between the detector and surface charge under test, firstly one has to calculate the electrostatic voltage distribution which appears in the space between the surface under test and the detector due to a charge on the surface under test. For the sake of obtaining the voltage distribution, the Poisson's equation is solved:

$$\nabla^2 V = -\rho/\in_o \quad (4)$$

where V is the voltage to be obtained from this calculation, ρ is the density of the charge distribution, and $\in_o$ is the dielectric constant of vacuum. One can visualize the electrostatic voltage with a computer enhancement of the numerical data. The Finite Element Method, a software for UNIX work station designed by Nihom Soken (Japan Research Institute, Limited), is used for the computer enhancement.

Secondly one determines the electrostatic field distribution around the detector and the surface under the test by utilizing the above mentioned voltage distribution. Thirdly one calculates the electrostatic force which is induced between the detector and the charge on surface the under test from data obtained through the previous two steps.

Figure 3:
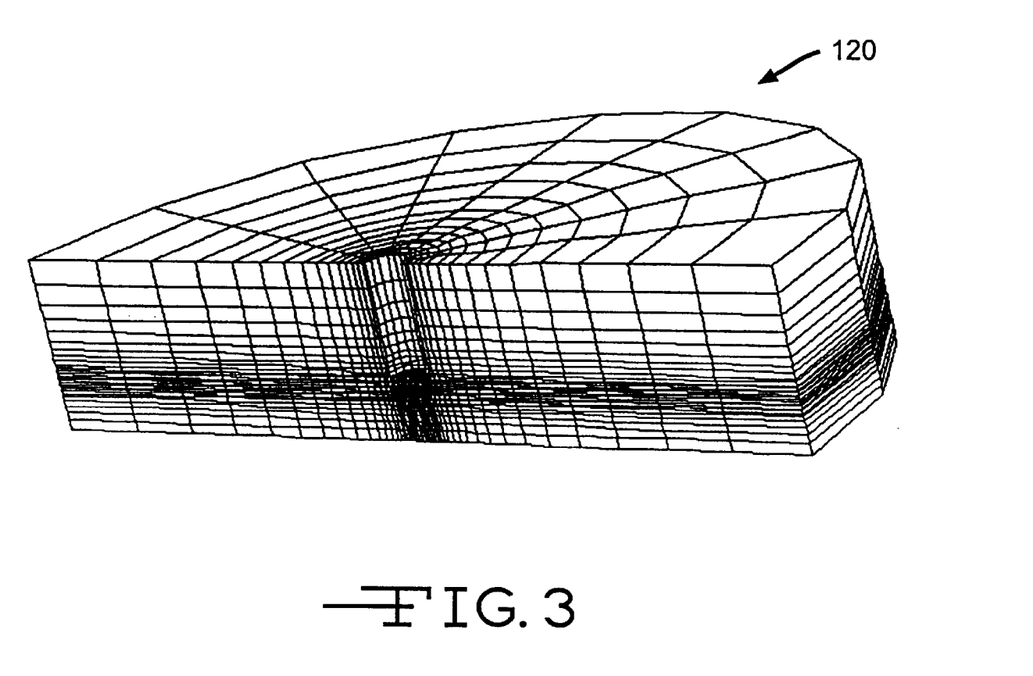
FIG. 3 is a diagrammatic view illustrating the mesh for the FEM calculation.
Figure 10A:
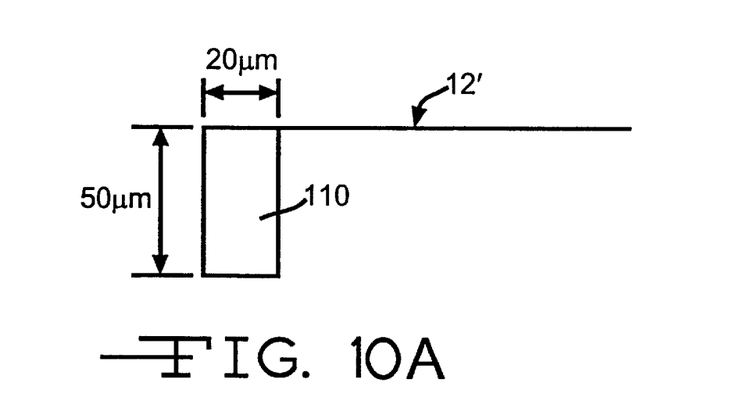
FIGS. 10A–10C are diagrammatic views illustrating different shaped detectors according to the present invention.
Figure 10B:
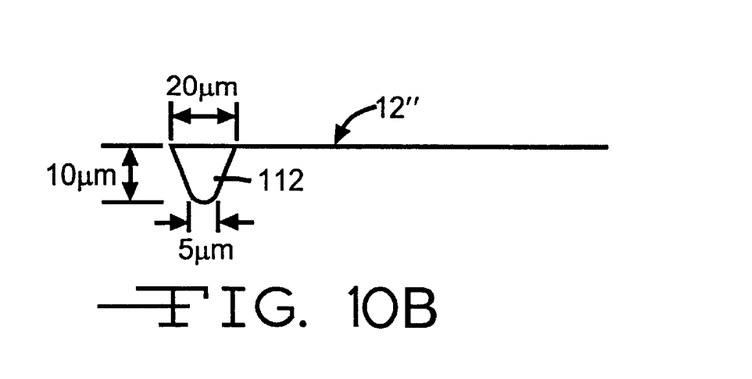
Figure 10C:
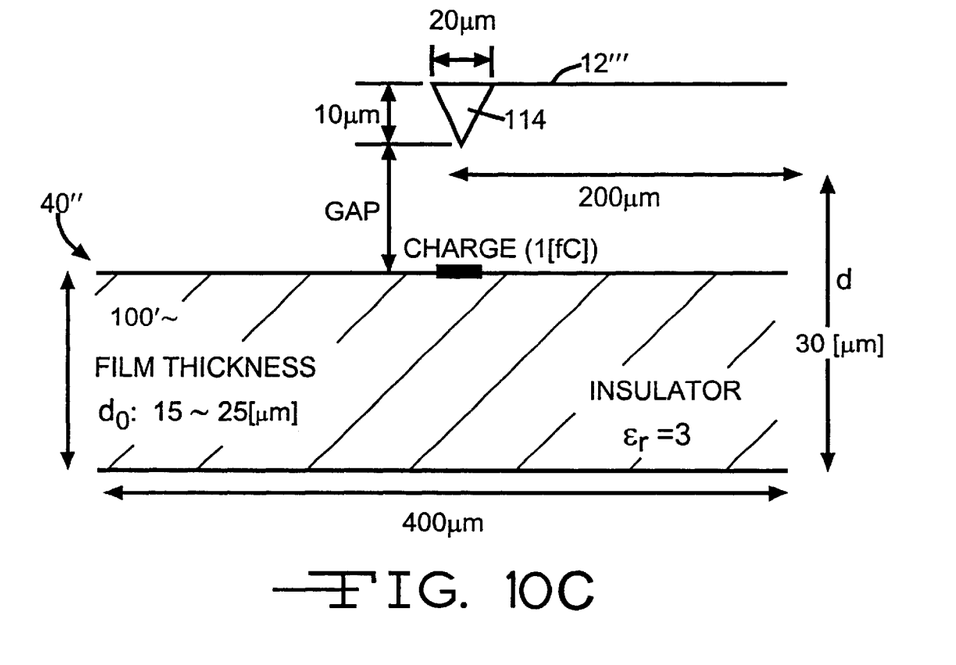

The electrostatic force on three different shaped detectors has been calculated. In one detector the tip 110 has a pillar shape as shown in FIG. 10A of which the diameter at the tip is 20 μm and the length of the tip is 50 μm, and in another detector the tip 112 has a cone shape as shown in FIG. 10B of which the diameter at the cantilever is 20 μm with a hemisphere 113 on the tip which a diameter of 5 μm. One other detector has a tip 114 with perfect or right conical shape as shown in FIG. 10C of which the diameter at the cantilever is 20 μm and the height is 10 82 m. A mesh configuration 120 for the FEM calculation for the pillar type detector is shown in FIG. 3. Finer calculation has been given to the area where it is close to the tip of the detector. The calculation tends to be broader in the area where it is relatively far away from the detector. The calculation is made based upon the conditions that:

1) The surface under test comprises a metal substrate and a layer of dielectric film having a thickness of 15 μm–25 μm of which the relative dielectric constant is 3.
2) The detector is located above the surface under test. The distance between the detector tip and the metal substrate is 30 μm.
3) A charge of 1 fC (1×10–15C) is located below the detector on the surface under test.

Each calculation of electrostatic force has been given for the three different shape detectors. Upon the calculations the thickness of dielectric film was changed from 15 μm to 25 μm. The results from these calculations furnish information on how the shape difference of detectors may influence the charge detection.

Figure 4:
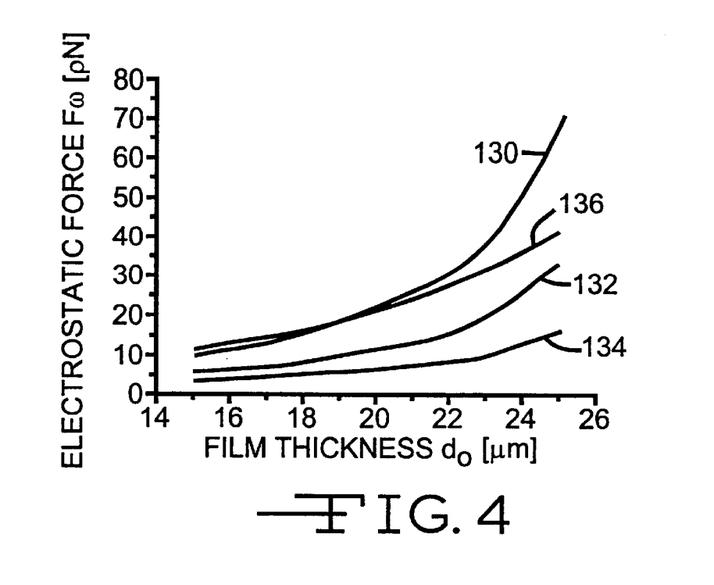
FIGS. 4–6 are graphs illustrating aspects of the present invention.
Figure 5:
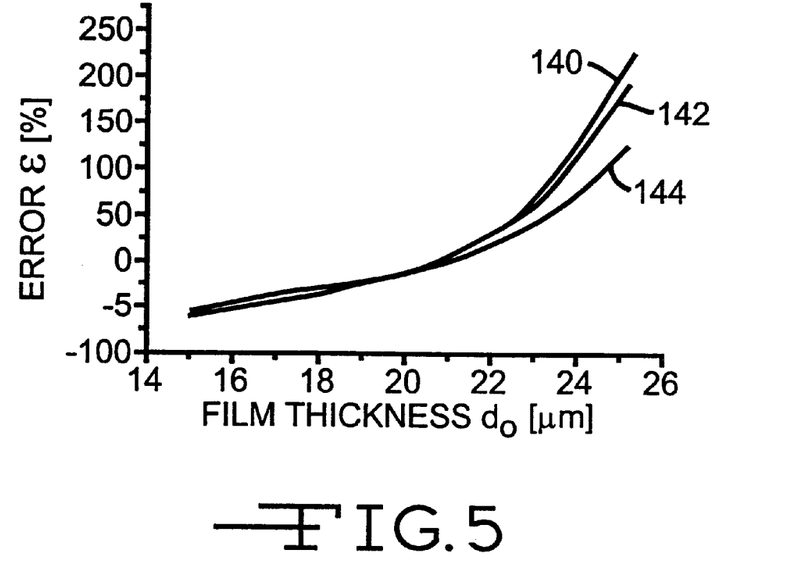
Figure 6:
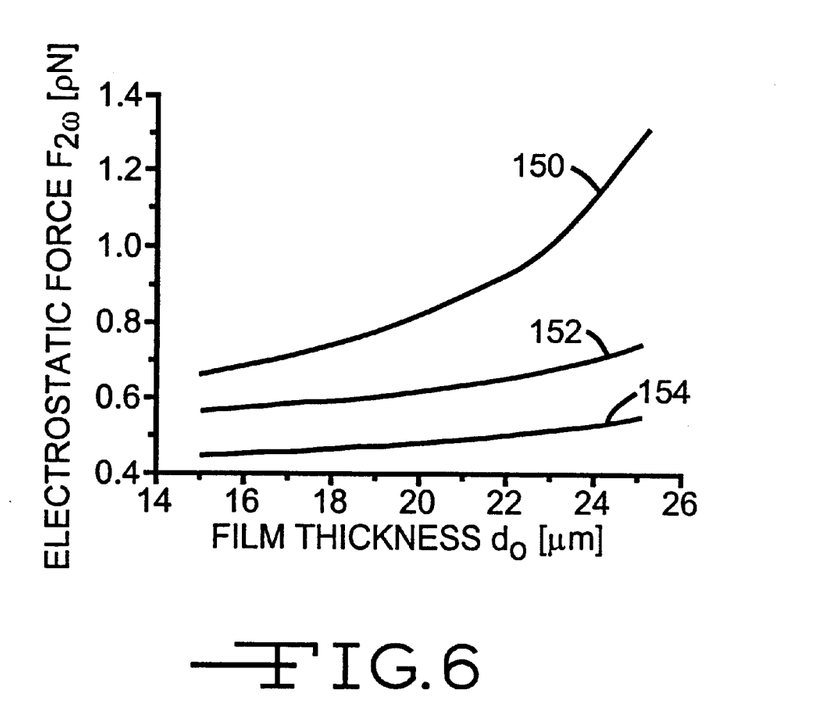

The calculated values in FIGS. 4–6 show the perpendicular component of the electrostatic force which is generated on the detector to the surface under test. It can be confirmed that the detector having wider area at the tip, which is in parallel with the surface under test, can generate larger electrostatic force. The result indicates that sensitivity should be sacrificed if higher spatial resolution is demanded or vise versa. Then, the shape of the detector is always subject to the consideration in accordance with the spatial resolution required. It is confirmed that the wider the area of the detector tip which sees surface under test, the larger the electrostatic force which will be detected.

For a conventional parallel plate model, the charge amount on surface under test is acquired through first obtaining a capacitance with using electrostatic force on the detector, then acquiring the charge amount by using the capacitance used as a constant for the mathematical formula (2) hereinabove. What has been done is to obtain the equivalent area as the parallel plate model for the pillar shaped detector at $d_o=20$ [μm], then the change of the electrostatic force of the parallel plate model in reference to the change of $d_o$ is plotted with dot line FIG. 4. The actual area of this parallel plate model is 282 [μm]². In particular, referring to FIG. 4, curve 130 is for the pillar type detector designated 110 in FIG. 10A, curve 132 is for the cone with hemisphere tip type 112 of FIG. 10B, curve 134 is for the cone type 114 of FIG. 10C and curve 136 is for the parallel plate model. It is found that the results from even the pillar model detector, which is very close to the parallel plate model in shape out of three different models, were different from the results of parallel plate model.

The error between the parallel plate model and the new calculation increases when the distance between the detector to surface under test (d–$d_o$) decreases, and when the distance reaches $d_o=25$ [μm], 50% of error has to be anticipated. This result indicates that the equivalent area in area parallel plane model on the actual detector changes whenever the film thickness of dielectric material (surface under test) changes.

In order to consider the film thickness measurement with using 2×ω component, it is necessary to either, obtain the equivalent area in the parallel model at several different places in accordance with the difference of the film thickness, or analyze the actual electrostatic force appearing on the detector directly. The error in conjunction with the change of film thickness with $d_o=20$ [μm] as a reference is shown in FIG. 5. In particular, curve 140 is for the pillar type detector designated 110 in FIG. 10A, curve 142 is for the cone with hemisphere tip type 112 of FIG. 10B, and curve 144 is for the cone type 114 of FIG. 10C. One is able to see the error of −50% to 250% in accordance with the film thickness of 20 [μm]±5 [μm], especially that the error is increasing when the detector gets closer to the surface under test. Therefore, the results suggest that the accurate charge amount cannot be obtained with parallel a plate model if the surface under test is not perfectly flat. To suppress the error less than 10% it is necessary to make the film thickness measurement with the resolution of 0.1 to 0.5 [μm].

If the dielectric constant is not infinite and the bottom of the surface under test is flat, the film thickness can be measured with the following method. Firstly, the detector tip is allowed to touch the bottom part of the surface under test so that the reference point is calibrated. Then the position of the detector is moved upward using the combination of piezo element 44 and scanner 48 shown in FIG. 1 and the position of the detector is set at that high point. The excursion amount of the detector is detected by measuring the voltage change at the piezo element. Then, one calculates each $F_{2\omega}$ component for the various film thickness of the dielectric film at a fixed distance between the detector tip and surface under test in advance so that the calculated results can be used as the parameter for the film thickness measurement. Therefore it is possible to obtain the film thickness from the measurement data and calculation results.

The electrostatic force to the detector ($F_{2\omega}$ component) is calculated in conjunction with the film thickness change. An AC bias voltage of 10V is applied to the detector. The results are reported in FIG. 6. In particular, curve 150 is for the pillar type detector designated 110 in FIG. 10A, curve 152 is for the cone with hemisphere tip type 112 of FIG. 10B, and curve 154 is for the cone type 114 of FIG. 10C. The least electrostatic force was expected from the small conical shaped detector model. Approximately 12[pN] of electrostatic force difference due to the film thickness change of 0.5 [$\mu$m] could be detected, and the detectable electrostatic force due to film thickness change is greater than the resolution of conventional Atomic Force Microscopes (AFM) in force detection. This confirmed on the calculation basis that the measurement of $d_o$ with a resolution of 0.5 [$\mu$m] should be accomplished with using the light leverage.

Figure 7:
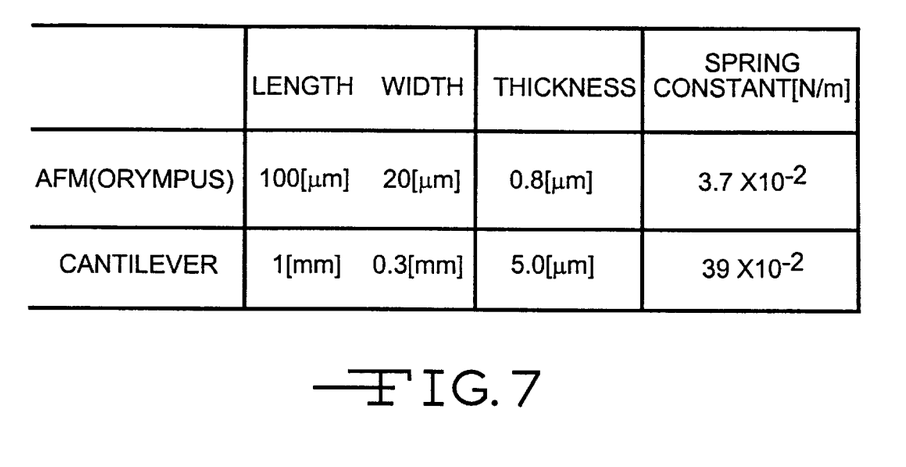
FIG. 7 is table providing comparison data illustrating sensibility of the cantilever in the detector of the present invention.
Figure 8:
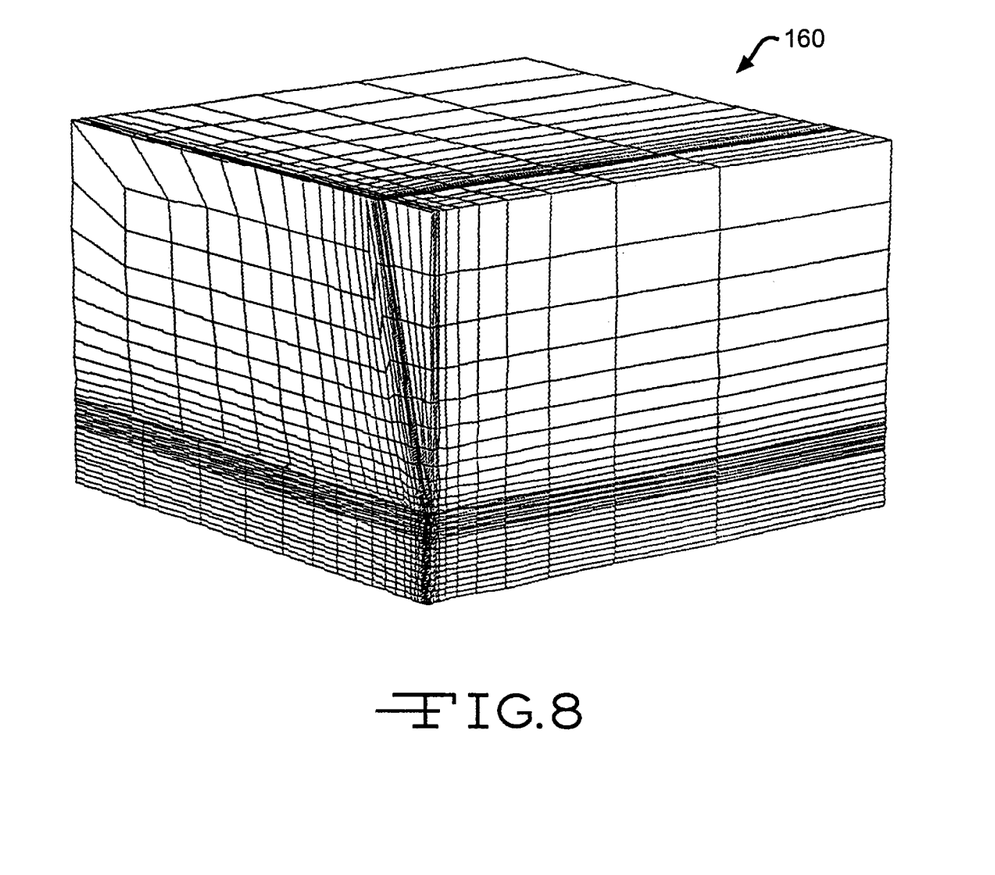
FIG. 8 is a diagrammatic view illustrating the mesh for the finite element calculation.
Figure 9:
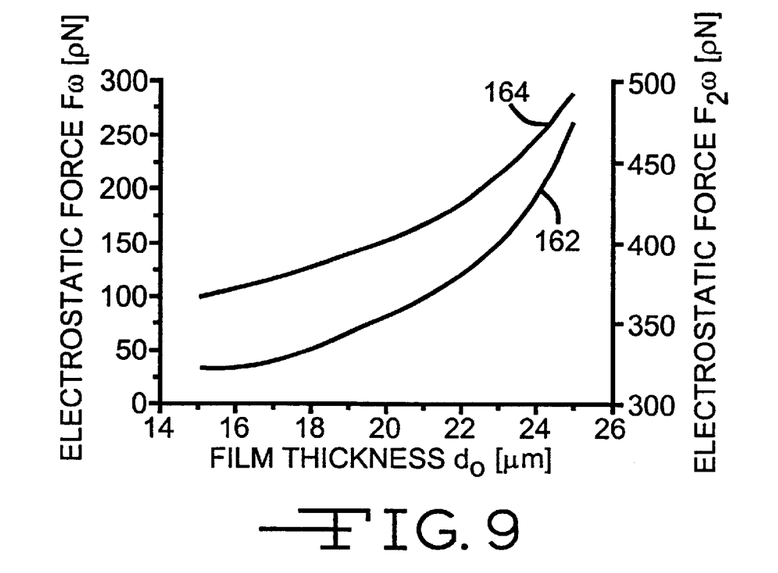
FIG. 9 is a graph illustrating another aspect of the present invention.

Based upon the above calculation results, several detectors are manufactured which are attached to each cantilever of which tip are a few to 10 [$\mu$m] in diameter. The material chosen for the detectors is nickel foil of which spring constant is in the range of a few to 10 mN/m. The physical dimensions and spring constant of the detector and cantilever which have been manufactured and those characteristics of the of the commercially available Atomic Force Microscope (AFM) detectors with cantilever are shown the table of in FIG. 7. As mentioned, the spring constant of the cantilevers which are manufactured is chosen almost identical to the spring constant of conventional AFM cantilevers. There can be obtained the detector of which tip diameter is less that 5 [$\mu$m]. The electrostatic charge measurement resolution of less than 1[fC]c, which may generate a few [pN] of electrostatic force on the detector tip, should be accomplished with a spatial resolution of 10 [$\mu$m]. Secondly, the electrostatic force appeared on the detector was calculated as per the calculation method shown in FIG. 4. The calculation model and the results are shown in FIG. 8 and 9 respectively. In particular, a mesh configuration 160 for the FEM calculation is shown in FIG. 8, and curves 162 and 164 in FIG. 9 are for the $F_\omega$ and $F2_\omega$ components, respectively. However, it should be noted that the calculation was merely given for the one quarter part of the actual three dimension model with using the symmetric nature of the calculation model due to the limitation on the memory storage capacity of the computer system, the detector needle being relatively long so that it was necessary to calculate large number of elements and nodes on the FEM.

From these calculation results, it was found that the detection error in every [$\mu$m] for the film having a 20 [$\mu$m] was 19.5%/$\mu$m, and to reduce the detection error to less than 10%/$\mu$m it is necessary to give a film thickness measurement with a resolution of less than 0.5 [$\mu$m]. If a VAC=15V was applied to the detector, $F_{2\omega}$ changed with a ratio of 1 pN/$\mu$m due to the AC field. Therefore the film thickness measurement can be accomplished with a resolution of 0.5 [$\mu$m]. Under the foregoing bias condition for the measurement, the field strength at the detector tip was $5.8 \times 10^6$ [V/m]. This field strength is low enough as compared to the field strength of $10^9$ [V/m] where corona discharge is supposed to begin, so that no corona generation is anticipated. Therefore, it is possible to measure both film thickness and charge amount on a sample under test using the detector of the present invention. On top of that, the erroneous reading of charge amount due to the change of film thickness can be reduced to less than 10%.

Figure 11:
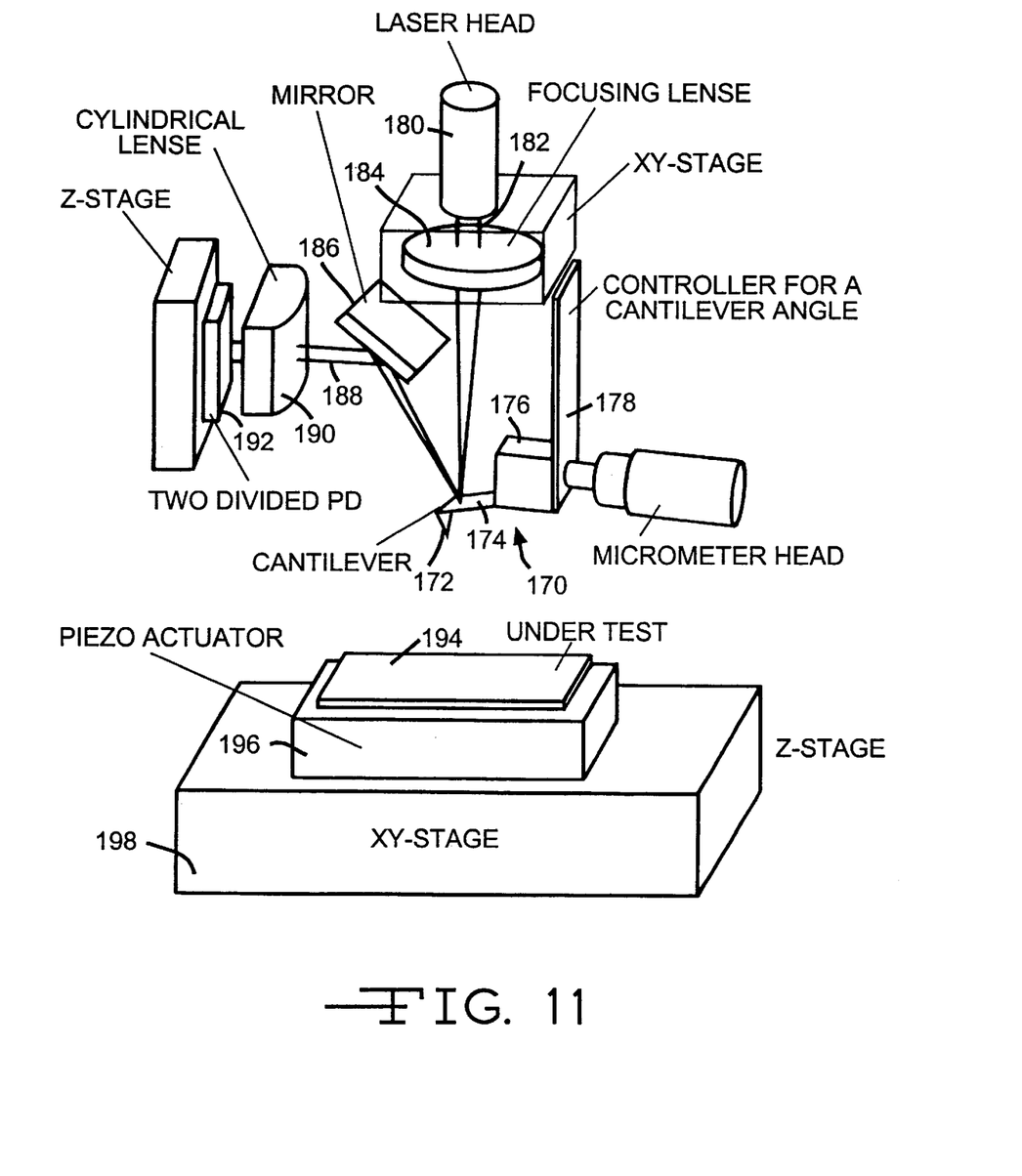
FIG. 11 is a diagrammatic perspective view illustrating a systematic head of an electrostatic force microscope according to the present invention.

The schematic diagram of the systematic head in FIG. 11 further illustrates the electrostatic force microscope of the present invention. Detector 170 has a tip 172 on one end of the cantilever arm 174, and the other end of arm 174 is fixed to a body 176 operatively associated with a controller 178 for the cantilever angle and a micrometer head. A laser head 180 provides a beam 182 which is focused by line 184 onto detector 170. A mirror 186 directs the reflected beam 188 to a cylindrical lens 190 which concentrates the beam onto a photodetector 192. The surface 194 under test is on a piezo actuator 196 operatively associated with an X-Y stage 198.

Figure 12A:
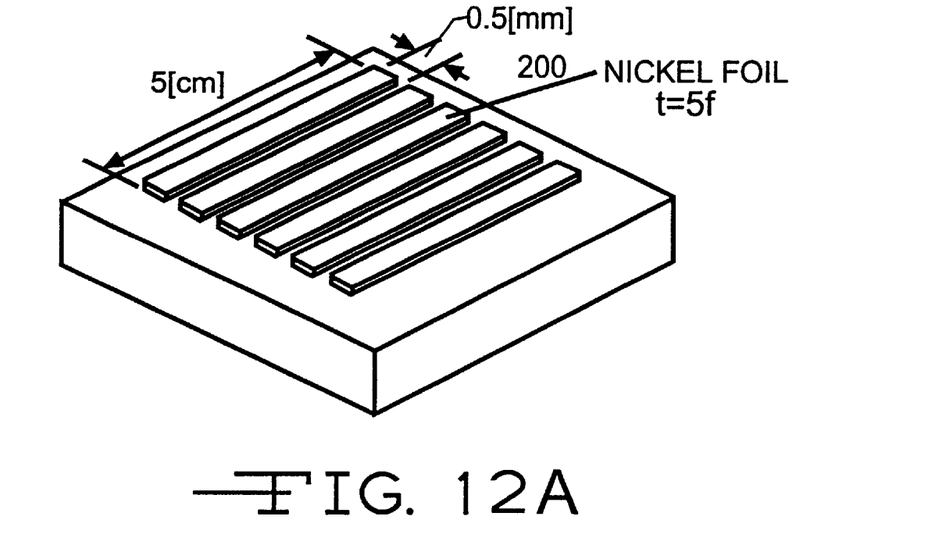
FIGS. 12A and 12B are perspective views illustrating a method of making the detector according to the present invention.
Figure 12B:
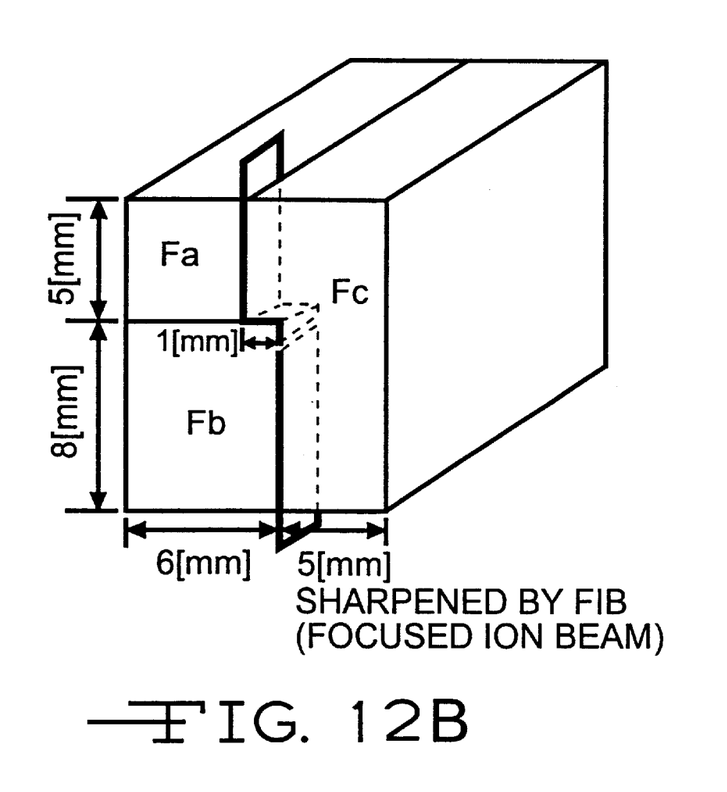

FIGS. 12A and 12B illustrate a method of manufacturing the detector of the present invention. In FIG. 12A a plurality of nickel foil strips, one of which is designated 200, are on the surface of a substrate body 202. Each strip, which is about 5 cm in length, 0.5 mm in width and 5$\mu$ thick, forms the arm of a detector. Nickel foil provides the advantage of sufficient flexibility for good vibrational performance, electrical conductivity, resistance to rust and ease of manufacture. FIG. 12B illustrates forming a detector tip by means of sharpening via a focused ion beam.

With the method and apparatus of the present invention scanning in a relatively large area, for example, several 100 cm$^2$, is provided with relatively high spatial resolution and a precise measurement of charge distribution. The influence of the shape of the detector tip or needle is taken into account, and a correction is provided for the influence of the change in dielectric film thickness on the sample under test. Analyzing the electrostatic force on the detector using the finite element method previously described provides an estimate of the influence due to the shape of the detector and the change in film thickness. For measuring a precise.a-mount of charge distribution if it is necessary to make the film thickness measurement. Error is calculated in accordance with film thickness, and the film thickness measurement method in accordance with the present invention is carried out by detecting $F_{2\omega}$.

In conclusion, an electrostatic force detector with cantilever has been designed and manufactured so that electrostatic charge can be detected on a dielectric film which is located on a conductive surface. It has been ascertained that by the method of knowing electrostatic charge amount on a certain thickness of film $d_o$ through obtaining electrostatic force, the electrostatic force is changed in accordance with the change of the film thickness $d_o$ because the equivalent detector tip area which sees the surface under test changes due to the change of $d_o$. A few concrete samples have been shown as well. The absolute amount of error which is generated by the change of film thickness has been calculated to prove that knowing absolute amount of electrostatic charge on a film can not be accomplished without compensating the data through knowing the dielectric film thickness change. A film thickness measurement method has been proposed with detecting $F_{2\omega}$ component out of applied AC bias voltage and confirmed that the error could be reduced less than 10% theoretically due to the change of film thickness $d_o$. A detector with cantilever was made out of nickel foil. The electrostatic force appeared on the detector was calculated to confirm the possibility of the electrostatic charge detection with less than 1 fC sensitivity and a spatial resolution of 10 [$\mu$m]. From these results, a simultaneous measurement of both electrostatic charge and film thickness of sample under test can be accomplished so that one can expect the measurement of absolute amount of electrostatic charge on a sample under test.

What is claimed is:
1. An electrostatic force microscope for measuring electrostatic force and film thickness of a sample under test having electrostatic charge on a surface thereof comprising:

a) a detector comprising a cantilever arm having a tip formation at one end and located in spaced relation to the sample under test so that electrostatic force is induced at the tip formation due to electrostatic charge on the sample under test, the detector further comprising an electromechanical transducer on the cantilever arm and spaced from the tip formation;

b) an optical system for transforming bending of the cantilever arm due to electrostatic force induced at the tip into an electrical signal output containing frequency components of the electrostatic force induced at the detector tip;

c) a series combination of an AC bias voltage source and a DC bias voltage source connected to said transducer; and d) a detection circuit connected to the AC bias voltage source and to the output of the optical system for detecting the frequency component of the electrostatic force induced at the detector tip and the component corresponding to twice that frequency for obtaining a simultaneous measurement of both electrostatic force and film thickness of the sample under test.

2. An electrostatic force microscope according to claim 1 further including a feedback circuit for applying the output of the detection circuit to the controlled source of D.C. bias voltage.

3. An electrostatic force microscope according to claim 1 further including means for applying the D.C. bias voltage to the sample under test.

4. An electrostatic force microscope according to claim 1, wherein the cantilever arm of said detector comprises a strip of nickel foil.

5. An electrostatic force microscope according to claim 1, wherein said tip formation of said detector is in the shape of a pillar having an end surface facing the sample under test and disposed in a plane substantially parallel to a plane containing the sample under test.

6. An electrostatic force microscope according to claim 1, wherein said tip formation is in the shape of a cone having a hemispherical shaped end facing the sample under test.

7. An electrostatic force microscope according to claim 1, wherein said tip formation is in the shape of a cone having a sharp end facing the sample under test.

8. A method for determining the electrostatic force induced between the cantilever arm detector of the electrostatic force microscope of claim 1 and the electrostatic charge on a surface of a sample under test comprising the steps of:

a) determining in a non-contacting means the electrostatic voltage distribution between the detector and the sample surface due to electrostatic charge on the sample surface;

b) utilizing the electrostatic voltage distribution obtained in step (a) to determine the electrostatic field distribution around the detector and the surface under test; and c) utilizing the electrostatic field distribution obtained in step (b) and the electrostatic voltage distribution obtained in step (a) to determine the electrostatic force induced between the detector and the charge on the sample under test.

9. A method for measuring the thickness of a dielectric film on a surface of a sample under test utilizing the electrostatic force microscope of claim 1 and comprising the steps of:

a) causing relative movement between the detector of the electrostatic force microscope and the surface under test so that the detector tip contacts the dielectric film to calibrate a reference point;

b) causing relative movement between the detector and the surface to set a position of the detector in spaced relation to the surface under test;

c) detecting the excursion of the detector; and d) determining the frequency component of the electrostatic force induced at the detector tip corresponding to twice the frequency for the thickness of the dielective film at a fixed distance between the detector tip and the surface under test so that the film thickness can be determined.

10. A method according to claim 9, wherein the twice frequency component is detected from the applied D.C. bias voltage for reducing error due to change in film thickness.

* * * * *